UNITED STATES PATENT OFFICE.

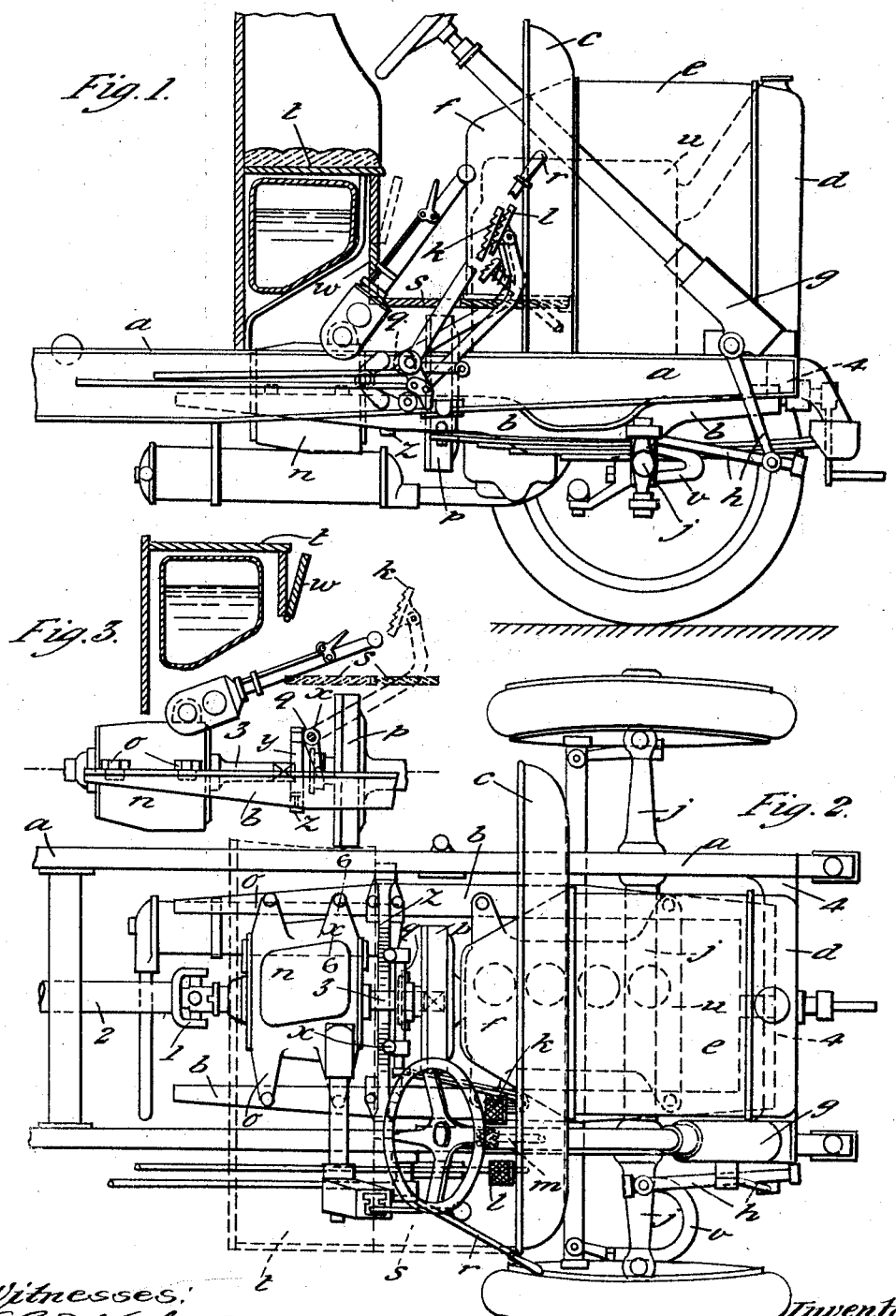

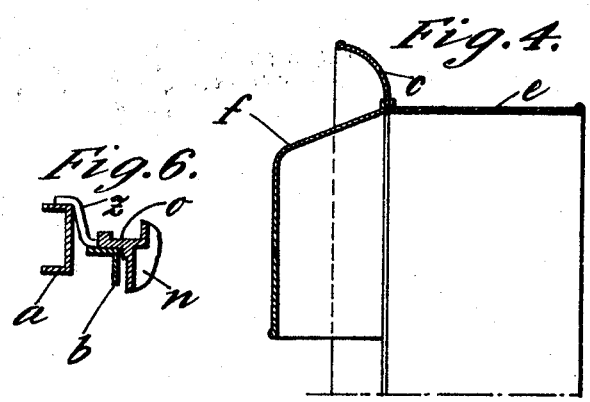
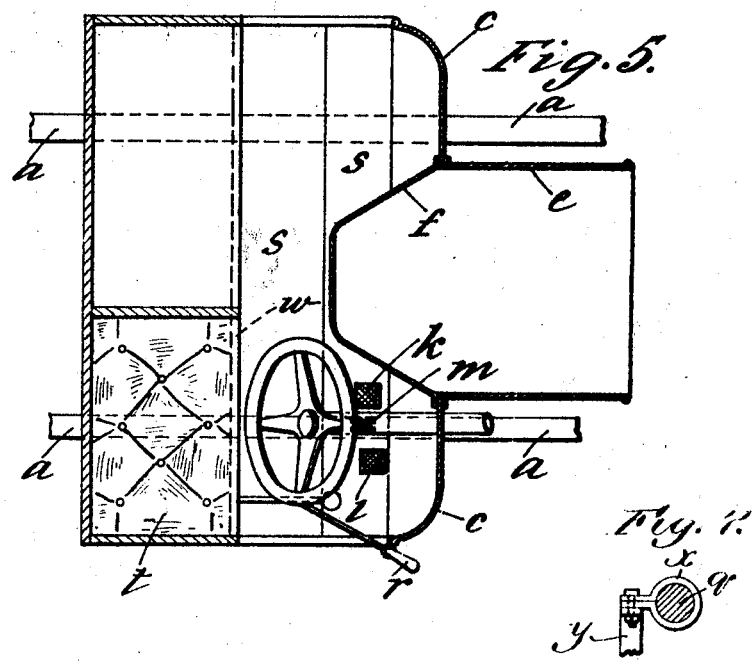

OLIVER DANSON NORTH, OF LONDON, ENGLAND, ASSIGNOR TO STRAKER-SQUIRE LIMITED, OF LONDON, ENGLAND.

MOTOR ROAD-VEHICLE.

1,326,772. Specification of Letters Patent. Patented Dec. 30, 1919.

Application filed September 24, 1917. Serial No. 192,946.

*To all whom it may concern:*

Be it known that I, OLIVER DANSON NORTH, a subject of the King of Great Britain, residing in London, England, have invented certain new and useful Improvements in Motor Road-Vehicles, of which the following is a specification.

This invention relates to improvements in motor road vehicles, particularly lorries, whereby the proportion of the load that is carried on the front axle is greater than in usual constructions.

For this purpose the driver's seat is placed close to the engine and his controlling pedals alongside of the engine. This departure from normal construction necessitates sundry subsidiary alterations as will be understood by reference to the accompanying drawings, in which Figure 1 is a sectional side elevation of the front part of the chassis of a motor-lorry, Fig. 2 is a plan, the driver's seat and foot-boards having been removed, Figs. 3 to 5 are detail views; Fig. 6 is a sectional view on the line 6—6 of Fig. 2; and Fig. 7 is a detail view of one of the removable bearings for the clutch-pedal shaft.

The position of the driver's seat *t* close to the engine *u* and of his clutch pedal *k*, brake pedal *l* and throttle pedal *m* alongside the engine, necessitates placing the dashboard *c* farther forward on the chassis than is customary and in order to preserve the normal distance of the dashboard from the driver, the former straddles the engine, having in it an opening of the same dimensions as the cross section of the bonnet *e*. The latter opens in the ordinary manner for affording access to the engine and to permit of this terminates at the dashboard, the rear portion of the engine being inclosed by a separate cover *f*, forming an extension of the bonnet. The large dimensions of the opening in the dashboard permit of access to all parts of the engine when the bonnet is open.

Since the driver sits over the right hand member of the frame *a* of the chassis, the steering gear box *g* is mounted at the front end of this member and the steering pillar is outside the bonnet. The link *h* and curved lever *v* are situated in front of the axle *j* instead of rearward thereof.

This position of the driver also makes it preferable that the brake pedal lever *l* and the hand brake lever *r* should be mounted, as shown, outside the frame of the chassis.

The change speed gear box *n* is placed as far forward as possible, that is to say, there is less space than usual between the gear box and the clutch *p*. In order that, notwithstanding this limited space, there may be easy access to the clutch for adjustment or repair, the gear box is mounted on an under-frame *b* so as to slide thereon, and there is a spigot and socket connection between the gear shaft 3 and the clutch. Lateral lugs *o* of the gear box rest on and are suitably guided upon rearwardly extending side members of the frame *b* (Fig. 6). When the clutch *p* is to be inspected, the foot board *s* (Fig. 1) is lifted out and the heel board *w* raised to the position shown in dotted lines (Fig. 1); the shaft *q* of the clutch pedal lever *k* is then removed together with the said lever. For this purpose the shaft *q* is mounted to turn in brackets *x* fixed by bolts and nuts to uprights *y* springing from a transverse member *z* of the frame *b*; by removing the nuts the shaft *q*, brackets *x* and pedal lever *k* can be removed together. The coupling 1 of the propeller shaft 2 (Fig. 2) is now disconnected, this end of shaft 2 is lowered and the gear box *n* is slid rearward into the position shown in Fig. 3, wherein the squared end of the gear shaft 3 is withdrawn from the socket of the clutch.

The underframe *b* also carries the engine *u*, and in order that it may have a certain play relative to frame *a* it is supported on the latter at three points, namely at each end of the transverse member *z* and at the middle of a second transverse member 4.

Having thus described the nature of the said invention and the best means I know of carrying the same into practical effect, I claim:—

1. In a motor vehicle, the combination of a chassis, an engine at the front end thereof, controlling pedals situated alongside the engine, a driver's seat so placed that the driver sits in position for operating the said pedals, a dashboard straddling the engine, an opening in the said dashboard of the same dimensions as the cross section of the bonnet and a bonnet made in two parts, one in front of the dashboard and the other behind it.

2. In a motor vehicle, the combination of a chassis frame, an engine at the front end thereof, controlling pedals alongside the engine, a bonnet, a driver's seat over the right hand member of the said frame, a steering gear box at the front end of the said member outside the bonnet and a rearwardly extending link and lever for transmitting the steering movement.

3. In a motor vehicle, the combination of a chassis frame, an engine at the front end thereof, controlling pedals alongside the engine, a bonnet, a driver's seat over the right hand member of the said frame, a steering-gear box at the front end of the said member outside the bonnet, a rearwardly extending link and lever for transmitting the steering movement, a clutch, a change speed gear box mounted close to the said clutch adapted to slide rearwardly away therefrom in order to give access to the clutch, a spigot and socket connection between the shaft of the said change speed gear and the said clutch.

4. In a motor vehicle, the combination of a chassis frame, an under frame supported on the chassis frame at three points, an engine mounted on the under frame, controlling pedals situated alongside the engine, a driver's seat so placed that the driver sits in position for operating said pedals, a bonnet in two parts, a clutch, a change speed gear mounted close to said clutch adapted to slide rearwardly therefrom in order to obtain access to said clutch, a pedal operating said clutch, a shaft turned by said pedal and bearings adapted for ready removal of said shaft.

5. In a motor vehicle, the combination of a chassis frame, an under frame supported on the chassis frame at three points, an engine mounted on the under frame, a clutch, a change speed gear mounted close to said clutch adapted to slide rearwardly therefrom in order to obtain access to said clutch, a pedal operating said clutch, a transversely disposed member of said under frame, and a shaft turned by said pedal mounted to turn in brackets removably secured to said transversely disposed member.

In testimony whereof I have signed my name to this specification in the presence of two subscribing witnesses.

OLIVER DANSON NORTH.

Witnesses:
C. S. HOPKINS,
W. J. SKERTEN.